(12) United States Patent
Izumi et al.

(10) Patent No.: US 10,245,810 B2
(45) Date of Patent: Apr. 2, 2019

(54) HEAT-RESISTANT MEMBER AND METHOD FOR MANUFACTURING THE SAME

(71) Applicant: NGK Insulators, Ltd., Nagoya (JP)

(72) Inventors: Yunie Izumi, Nisshin (JP); Yoshimasa Kobayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 31 days.

(21) Appl. No.: 14/621,547

(22) Filed: Feb. 13, 2015

(65) Prior Publication Data

US 2015/0266273 A1 Sep. 24, 2015

(30) Foreign Application Priority Data

Mar. 19, 2014 (JP) ................................. 2014-055878

(51) Int. Cl.
| | |
|---|---|
| *B32B 18/00* | (2006.01) |
| *B32B 15/04* | (2006.01) |
| *C04B 35/26* | (2006.01) |
| *C04B 35/45* | (2006.01) |
| *C23C 16/40* | (2006.01) |

(Continued)

(52) U.S. Cl.
CPC .............. *B32B 18/00* (2013.01); *B32B 15/04* (2013.01); *C04B 35/26* (2013.01); *C04B 35/45* (2013.01); *C04B 41/009* (2013.01); *C04B 41/5036* (2013.01); *C04B 41/87* (2013.01); *C23C 28/04* (2013.01); *C23C 28/042* (2013.01); *B32B 2307/202* (2013.01); *B32B 2307/306* (2013.01);

(Continued)

(58) Field of Classification Search
None
See application file for complete search history.

(56) References Cited

U.S. PATENT DOCUMENTS 5,110,658 A * 5/1992 Nakano ................ G11B 5/7023
428/141
5,178,967 A * 1/1993 Rosenfeld .............. C25D 11/04
156/150

(Continued)

FOREIGN PATENT DOCUMENTS

| DE | 100 50 010 A1 | 4/2002 |
|---|---|---|
| JP | 53030800 A * | 3/1978 |

(Continued)

OTHER PUBLICATIONS

WO2011/048307_MT Apr. 28, 2011.*

(Continued)

*Primary Examiner* — David Sample
(74) *Attorney, Agent, or Firm* — Burr & Brown, PLLC (57) ABSTRACT

A heat-resistant member according to the present invention includes a member to be protected and a metal oxide ceramic protective layer which is disposed on part of or all surfaces of the member to be protected and which has a porosity of 0 percent by volume or more and 5 percent by volume or less. This heat-resistant member is produced through the step of forming a protective layer by firing a member to be protected provided with a metal raw material in the air in a temperature range lower than the melting point of an oxide of the metal raw material to form a metal oxide ceramic protective layer having a porosity of 0 percent by volume or more and 5 percent by volume or less on part of or all surfaces of the member to be protected.

13 Claims, 4 Drawing Sheets

(51) Int. Cl.
*C23C 28/04* (2006.01)
*C04B 41/87* (2006.01)
*C04B 41/00* (2006.01)
*C04B 41/50* (2006.01)

(52) U.S. Cl.
CPC .... *Y10T 428/265* (2015.01); *Y10T 428/31536* (2015.04)

(56) References Cited

U.S. PATENT DOCUMENTS

| | | |
|---|---|---|
| 2003/0138641 A1 | 7/2003 | Fukudome et al. |
| 2008/0311387 A1 | 12/2008 | Gillesberg et al. |
| 2009/0029187 A1 | 1/2009 | Schuisky et al. |
| 2010/0108953 A1 | 5/2010 | Kusnezoff et al. |
| 2010/0193104 A1 | 8/2010 | Ryu et al. |
| 2011/0287341 A1* | 11/2011 | Inoue .................. H01M 8/0228 429/532 |
| 2016/0002110 A1* | 1/2016 | Izumi ..................... B32B 15/04 428/332 |

FOREIGN PATENT DOCUMENTS

| | | |
|---|---|---|
| JP | 08-319582 A1 | 12/1996 |
| JP | 2004-175627 A | 6/2004 |
| JP | 2008-522037 A | 6/2008 |
| JP | 2009-293058 A1 | 12/2009 |
| JP | 2010-523823 A | 7/2010 |
| JP | 2010-202490 A | 9/2010 |
| WO | WO 2011048307 A1 * 4/2011 ........... C01G 45/006 |

OTHER PUBLICATIONS

Extended European Search Report (Application No. 15157954.7) dated Jul. 17, 2015.
European Office Action, European Application No. 15157954.7, dated Feb. 17, 2017 (5 pages).
Japanese Office Action (with English Translation), Japanese Application No. 2014-055878, dated Jun. 27, 2017 (6 pages).

* cited by examiner

HEAT-RESISTANT MEMBER AND METHOD FOR MANUFACTURING THE SAME

BACKGROUND OF THE INVENTION

1. Field of the Invention

The present invention relates to a heat-resistant member and a method for manufacturing the same.

2. Description of the Related Art

Hitherto, as for heat-resistant members, a member in which a first layer made from ceramic having a large thermal expansion coefficient and a second layer made from ceramic having a thermal expansion coefficient smaller than that of the first layer and having an insulating property are stacked sequentially on the surface of a metal has been proposed (for example, refer to PTL 1). It is mentioned that even in the case where a high temperature and a thermal shock are applied to this member, peeling does not occur, the metal is protected, and the insulating property is maintained favorably. Also, as for the heat-resistant members, a member in which a second ceramic film having a relative density of 95% or more is stacked on a first ceramic film having a relative density of 95% or less has been proposed (for example, refer to PTL 2). It is mentioned that this member has good heat resistance, thermal shock resistance, and oxygen barrier property and interfacial delamination is suppressed.

PTL 1: JP 8-319582 A
PTL 2: JP 2009-293058 A

SUMMARY OF THE INVENTION

However, in this member described in PTL 1, a ceramic powder of an oxide is formed an the surface of a metal and, for example, the bondability between the metal surface and the first layer is not sufficient, so that a further improvement is necessary. Also, it is not possible to utilize for applications in which the electrical conductivity at a high temperature is required because an insulating film is formed on the metal. Meanwhile, as for the member described in PTL 2, the ceramic film is formed by an aerosol deposition or plasma splaying method and, therefore, there are many limitations to the steps and a ceramic laminate is not produced easily. Also, in some cases, it is difficult to increase the film thickness.

The present invention has been made in consideration of such issues and a main object is to provide a heat-resistant member, wherein changes in characteristics can be reduced more than ever before by a simpler method, and a method for manufacturing the same.

The Inventors conducted intensive research to achieve the above-described main object and found that a heat-resistant member was able to be produced, wherein changes in characteristics were reduced by a simpler method on the basis of formation of a metal powder on the surface of a metal member or non-oxide ceramic and performing firing, and the present invention has been completed.

That is, the heat-resistant member according to the present invention includes a member to be protected and a metal oxide ceramic protective layer which is disposed on part of or all surfaces of the above-described member and which has a porosity of 0 percent by volume or more and 5 percent by volume or less.

A method for manufacturing a heat-resistant member, according to the present invention, includes the step of forming a protective layer by firing a member provided with a metal raw material in the air in a temperature range lower than the melting point of an oxide of the above-described metal raw material to form a metal oxide ceramic protective layer having a porosity of 0 percent by volume or more and 5 percent by volume or less on part of or all surfaces of the above-described member.

The present invention can provide a heat-resistant member by a simpler method, wherein changes in characteristics are reduced more than ever before. The reason for this is estimated as described below. For example, the protective layer is metal oxide ceramic and, therefore, is stable under high temperatures and an oxygen atmosphere. In addition, the raw material of the protective layer is specified to be a metal raw material relatively rich in the reactivity, so that the reaction with the member to be protected occurs easily to same extent, and the protective layer and the member to be protected can be bonded in the state in which, for example, the component of the member to be protected is taken in and this component is diffused. Meanwhile, it is considered that firing is performed in the air, the metal is oxidized and is changed to become difficult-to-react and, thereby, the member component taken in is prevented from excessively diffusing into the protective layer. Therefore, changes in the characteristics, e.g., the electrical conductivity and the oxidation resistance, can be reduced more than ever before by a simple method in which the metal raw material is formed and firing is performed in the air.

DESCRIPTION OF THE PREFERRED EMBODIMENTS

Figure 1:
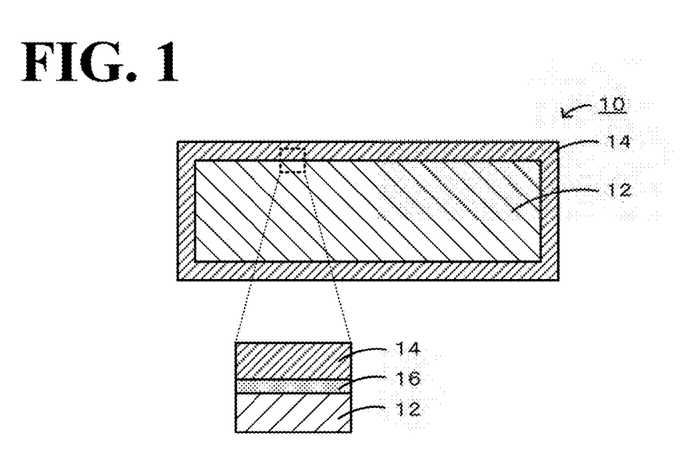
FIG. 1 is an explanatory diagram schematically showing an example of the configuration of a heat-resistant member 10.
Figure 2:
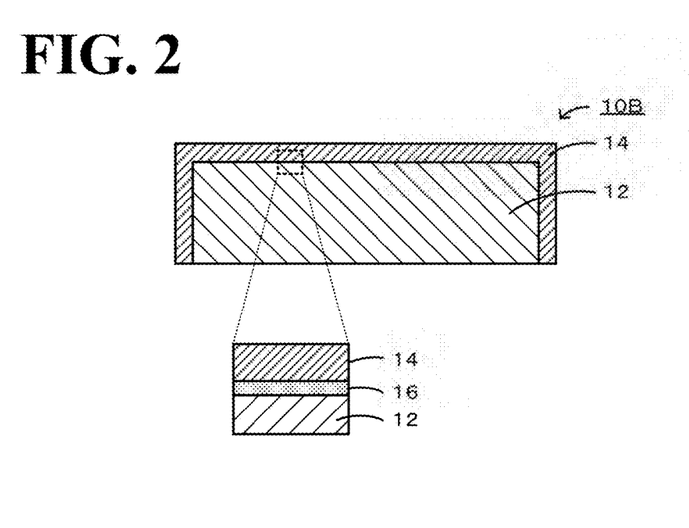
FIG. 2 is an explanatory diagram schematically showing an example of the configuration of a heat-resistant member 10B.
Figure 3:
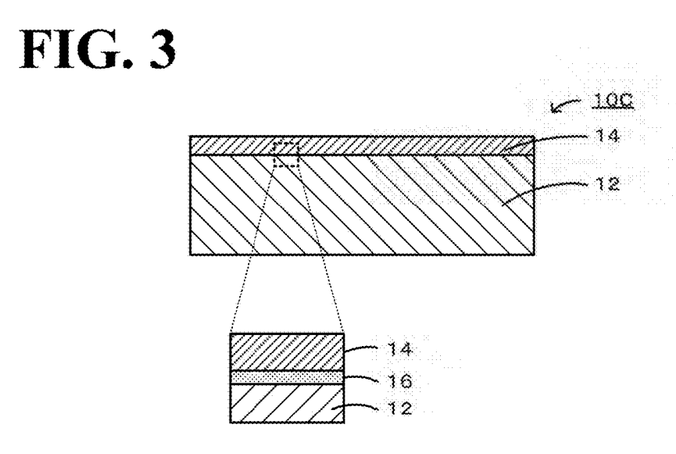
FIG. 3 is an explanatory diagram schematically showing an example of the configuration of a heat-resistant member 10C.
Figure 4:
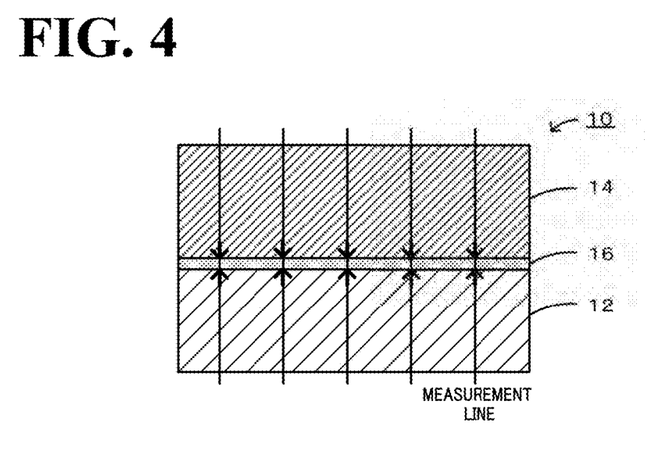
FIG. 4 is an explanatory diagram illustrating determination of the thickness of a reaction layer.

Next, embodiments to carry out the present invention will be explained with reference to the drawings. FIG. 1 is an explanatory diagram schematically showing an example of the configuration of a heat-resistant member 10 according to an embodiment of the present invention. FIG. 2 is an explanatory diagram schematically showing an example of the configuration of a heat-resistant member 10B. FIG. 3 is an explanatory diagram schematically showing an example of the configuration of a heat-resistant member 10C. FIG. 4 is an explanatory diagram illustrating determination of the thickness of a reaction layer. As shown in FIG. 1, the heat-resistant member 10 according to an embodiment of the present invention includes a member to be protected 12 which is an object member of protection and a metal oxide ceramic (hereafter may be simply referred to as oxide ceramic) protective layer 14 which is disposed all over the surfaces of the member to be protected 12 and which has a porosity of 0 percent by volume or more and 5 percent by volume or less. Alternatively, as shown in FIG. 2, the heat-resistant member 10B including the member to be protected 12 and an oxide ceramic protective layer 14 which is disposed on the side surface and the upper surface (partly) of the surfaces of the member to be protected 12 and which has a porosity of 0 percent by volume or more and 5 percent by volume or less may be employed. Alternatively, as shown in FIG. 3, the heat-resistant member 10C including the member to be protected 12 and an oxide ceramic protective layer 14 which is disposed on one surface (partly) of the surfaces of the member to be protected 12 and which has a porosity of 0 percent by volume or more and 5 percent by volume or less may be employed. That is, the protective layer 14 may be disposed on part of or all surfaces of the member to be protected 12. Also, the protective layer 14 may be a member made from metal oxide ceramic.

The member to be protected may be a metal member having the electrical conductivity or be non-oxide ceramic. The metal member is not specifically limited insofar as the member is made from a metal, e.g., a typical metal or a transition metal. For example, a metal member having high electrical conductivity is preferable. As for the transition metals, metals and alloys of Fe, Co, Ni, Cu, and the like are preferable. Also, noble metals, e.g., Pt and Au, may be used in accordance with the use. This metal member may be an electrode. In this case, for example, stainless steels, e.g., a Cr—Ni—Fe based alloy (SUS304) and a Cr—Fe based alloy (SUS430), are used favorably. This metal member is preferably an alloy containing at least Fe and Cr, and more preferably an alloy containing at least Fe of 70 percent by mass or more and less than 90 percent by mass and Cr of 10 percent by mass or more and less than 30 percent by mass. This is because the material is stable and the electrical conductivity is good. The shape of the metal member may be tabular or the like and can be selected in accordance with the use. For example, the non-oxide ceramic may have low electrical conductivity or no electrical conductivity or may have the electrical conductivity. Examples of non-oxide ceramic include silicon carbide, silicon nitride, gallium nitride, titanium nitride, and zirconium nitride. The term "have the electrical conductivity" refers to the case where the electric resistivity is less than $10^6$ Ωcm, and the term "have no electrical conductivity" refers to the case where the electric resistivity is 10 Ωcm or more.

Alternatively, the member to be protected may be porous ceramic or be dense ceramic. The porous ceramic is not specifically limited insofar as the ceramic has porousness. The term porousness refers to having open pores in the surface thereof and, for example, the porosity may be 10 percent by volume or more, preferably 20 percent by volume or more, and more preferably 40 percent by volume or more. Meanwhile, from the viewpoint of simple production, the porosity is preferably 90 percent by volume or less. The porosity of the porous ceramic may be selected appropriately in accordance with the use thereof and the like. The average pore diameter of this porous ceramic is preferably within the range of, for example, 1 μm or more and 300 μm or less. In this range, the protective layer enters into pores of the porous ceramic easily and bonding can became firmer. This average pore diameter is more preferably 5 μm or more, and further preferably 10 μm or more. Also, this average pore diameter is more preferably 100 μm or less, and further preferably 50 μm or less. The porosity and the average pore diameter of the porous ceramic refer to measurement results on the basis of a mercury penetration method.

This porous ceramic may be formed containing at least one inorganic material selected from the group consisting of, for example, carbides, e.g., silicon carbide, titanium carbide, zirconium carbide, and boron carbide, nitrides, e.g., silicon nitride, aluminum nitride, titanium nitride, and zirconium nitride, oxynitrides, e.g., sialon, silicides, e.g., molybdenum silicide, and zirconium phosphate. Also, the porous ceramic may be formed containing at least one inorganic material selected from the group consisting of, for example, cordierite, mullite, zeolite, aluminum titanate, aluminum oxide, zirconium oxide, titanium oxide, silicon oxide, and magnesium oxide. The shape of the porous ceramic is not specifically limited and can be selected in accordance with the use thereof. Examples thereof include a tabular shape, a cylindrical shape, and a honeycomb shape. A structure through which a fluid can pass may be employed. Specifically, this porous ceramic has preferably a honeycomb structure provided with a partition portion constituting a plurality of cells serving as flow passages. This porous ceramic may have, for example, the electrical conductivity. In this case, the porous ceramic may be a composite material (Si-bonded SiC ceramic) containing SiC and Si to bond SiC, where pores are formed from SiC and Si concerned.

The dense ceramic is not specifically limited insofar as a dense member having a low porosity is employed. For example, the porosity may be 5 percent by volume or less, preferably 1 percent by volume or less, and more preferably 0.5 percent by volume or less. The dense ceramic may be, for example, a member produced by densely sintering any one of the materials mentioned as the above-described porous ceramic, a member produced by filling pores of the porous ceramic with a filler, an impregnant, or the like, or a composite oxide member containing a plurality of types of metals. Specific examples of the members filled include a Si-impregnated SiC sintered material in which pores of porous SiC are impregnated with metal Si. This material has good thermal conductivity and, in addition, good electrical conductivity based on metal Si. Meanwhile, examples of composite oxide members include electrically conductive ceramic materials, e.g., $LaCrO_3$ based materials, $BaTiO_3$ based materials, $LaMnO_3$ based materials, $LaCoO_3$ based materials, $NaCo_2O_4$ based materials, $Ca_3Co_4O_9$ based materials, $LaNiO_3$ based materials, and $SrTiO_2$ based materials. The purport of the term "based material" is that materials, part of which are substituted with, for example, alkali metal elements, alkaline earth metals, or elements having different valences, are included. Specifically, as for the $LaMnO_3$ based materials, $(La_{0.9}Sr_{0.1})MnO_3$ and the like are mentioned.

The protective layer according to the present invention is disposed on part of or all surfaces of the member to be protected and is formed from oxide ceramic having a porosity of 0 percent by volume or more and 5 percent by volume or less. The oxide ceramic may be an oxide of a typical metal or an oxide of a transition metal. Among them, a transition metal oxide is preferable from the viewpoint of exhibition of the electrical conductivity. As for the transition metal, it is preferable that at least one selected from the group consisting of, for example, Fe, Co, Ni, Mn, Cu, Ti, V, Zr, Nb, Mo, Ta, and W, be contained, and Fe, Ni, Mn, Cu, and the like are more preferable. For example, the oxide ceramic may be at least one of $Fe_2O_3$, NiO, $MnO_2$, and CuO. This oxide ceramic may have the electrical conductivity or have no electrical conductivity in accordance with the use thereof. For example, the oxide ceramic may have no electrical conductivity for the purpose of only covering the member to be protected. Meanwhile, on the occasion of covering the member to be protected, which has the electrical conductivity, it is preferable that the oxide ceramic have the electrical conductivity.

In the heat-resistant member according to the present invention, a reaction layer may be disposed between the member to be protected and the protective layer. This reaction layer is preferably 3.0 μm or less, and more preferably 1.0 μm or less. In the case where the protective layer is formed on the member to be protected and a firing treatment is performed, when heating is performed, the member to be protected and the oxide ceramic are reacted and a reaction layer based on at least one of the member to be protected and the protective layer may be generated. The method for determining the thickness of this reaction layer will be described. FIG. 4 is an explanatory diagram illustrating a method for determining the thickness of a reaction layer 16. The thickness of the reaction layer 16 which is generated at the interface between the member to be protected 12 and the protective layer 14 is measured by using an image obtained on the basis of observation with an electron microscope (SEM). Specifically, a cross-section of the heat-resistant member 10 is observed with SEM-EDX at the magnification of 3,000 times. Subsequently, perpendicular lines (measurement lines) which divide the interface of this image into five equal parts and which are normal to the interface are drawn, and the length between the point of intersection of the lower limit of the reaction layer 16 generated at the interface and the measurement line and the point of intersection of the upper limit and the measurement line is measured. Then, an average of the five places is specified to be the thickness of the reaction layer.

The porosity of the protective layer according to the present invention is 0 percent by volume or more and 5 percent by volume or less, more preferably 4 percent by volume or less, and further preferably 3 percent by volume or less. The oxide ceramic is more preferably a dense body from the viewpoint of the strength. The porosity of this protective layer is preferably 0.5 percent by volume or more, and more preferably 1 percent by volume or more. It is more preferable that the oxide ceramic have pores from the viewpoint of stress relaxation. The method for calculating the porosity of this oxide ceramic will be described. The porosity of the oxide ceramic is determined by subjecting the image of the microstructure photograph taken with SEM, as described above, to image analysis by using image analysis software. Initially, a portion having an area of $0.5 \times 10^{-6}$ m$^2$ is selected from the oxide ceramic of the protective layer arbitrarily, and binarization is performed to distinguish the images of pores and oxide ceramic. The condition for performing the binarization is set appropriately in accordance with the resulting image and, for example, values determined empirically are used. The oxide ceramic and pores thereof are separated on the basis of the resulting binarized image and the porosity is determined by calculating the area ratio thereof. This area ratio of the cross-section is assumed to substantially correspond to the volume ratio and, therefore, is specified to be the porosity (percent by volume).

In the protective layer according to the present invention, the volume change ratio Y/X, which is the ratio of a volume after oxidation Y to a volume before oxidation X, of the oxide ceramic is preferably 0.7 or more. This volume change ratio Y/X is more preferably 1.3 or more, and further preferably 1.6 or more. For example, as for the volume change ratio Y/X, $Fe_2O_3/Fe$ is 2.14, CuO/Cu is 1.77, $Mn_2O_3/Mn$ is 2.22, NiO/Ni is 1.62, MgO/Mg is 0.79, and $Al_2O_3/Al$ is 1.28.

In the protective layer according to the present invention, it is preferable that the oxide ceramic contain a second component which is a metal element, besides a first component, which is a metal as a main component. In the case where the protective layer contains the second component, for example, the oxide of the first component (hereafter may be referred to as the main oxide) of the oxide ceramic makes a solid solution with the second component and, thereby, the electrical conductivity is further given, so that reduction in the electrical conductivity due to use by heating can be further suppressed favorably. Also, in the case where the protective layer contains the second component, favorably, the electric resistance of the protective layer can be further reduced and heat generation does not occur easily. This second component is preferably, for example, a metal element having a valence different from the valence of the first component of the oxide ceramic, and may be the same type of metal as the first component or be a different type of metal. This second component is preferably at least one element of, for example, Li, Na, K, Ga, Si, Zr, Ti, Sn, Nb, Sb, and Ta. This protective layer may be produced by, for example, adding a compound containing the second component (hereafter may be referred to as second compound) to a raw material containing the first compound. This second compound may be an electrically conductive aid. This second compound may be a carbonate, an oxide, a hydroxide, a chloride, or a nitrate or may be a carbonate or an oxide among them. The content of the second component is preferably, for example, 0.2 percent by mole or more on an amount of moles of the elements in the protective layer basis, more preferably 0.5 percent by mole or more, and further preferably 1.0 percent by mole or more. Meanwhile, this content is preferably 50 percent by mole or less, more preferably 30 percent by mole or less, and further preferably 15 percent by mole or less. Specifically, in the case where the main oxide of the oxide ceramic is $Fe_2O_3$, examples of the second compounds include $Fe_3O_4$ and FeO, which are the same type of elements, and $TiO_2$, $SnO_2$, $Nb_2O_5$, $SiO_2$, $ZrO_2$, and the like, which are different types of elements. Also, in the case where the main oxide is CuO and NiO, examples of the second compounds include $Li_2CO_3$, $Na_2Co_3$, and $K_2CO_3$. The term "main oxide" refers to an oxide having a largest content in the compounds constituting the protective layer and, for example, may be an oxide constituting 40 percent by mole or more of the protective layer, be an oxide constituting 50 percent by mole or more, or be an oxide constituting 70 percent by mole or more.

Meanwhile, in the heat-resistant member according to the present invention, it is preferable that the bondability between the member to be protected and the protective layer be high. The high bondability refers to that occurrences of peeling and cracking are not observed at the interface between the member to be protected and the protective layer. The method for evaluating the bondability will be described. An observation sample is prepared by embedding the heat-resistant member into a resin and performing polishing to an extent of a mirror-smooth state with a diamond slurry or the like. Subsequently, occurrences of peeling between the member to be protected and the protective layer and cracking in the member to be protected and the protective layer are examined by performing observation with a scanning electron microscope (SEM) at the magnification of 1,500 times or more. The bondability between the member to be protected and the protective layer can be evaluated on the basis of the examination results.

Meanwhile, the heat-resistant member in which the protective layer is disposed on the surface of the electrical conductive member to be protected has an electric resistivity of preferably $10^6$ Ωcm or less. Also, the heat-resistant member has an electric resistivity of more preferably $10^5$ Ωcm or less, and further preferably $10^3$ Ωcm or less. As the electric resistivity becomes low, the electrical conductivity becomes excellent and the electricity can be utilized efficiently, although it is said that the lower limit is about $10^{-2}$ Ωcm because of the configuration of the material. The electric resistivity is measured by a two-terminal method, where a measurement sample is prepared by baking a Ag paste serving as electrodes on a heat-resistant member worked or produced into a rectangular parallelepiped 20 mm square.

The heat-resistant member according to the present invention may be produced through a protective layer forming step to fire the member to be protected, which is provided with a metal raw material, in the air in a temperature range lower than the melting point of an oxide of the metal raw material, so as to form a metal oxide ceramic protective layer having a porosity of 0 percent by volume or more and 5 percent by volume or less on part of or all surface of the member to be protected. In this step, the protective layer is formed from metal oxide ceramic obtained on the basis of oxidation of the metal raw material by firing. The firing temperature is set within a favorable range in accordance with the material of the protective layer and is preferably 400° C. or higher, more preferably 500° C. or higher, and further preferably 600° C. or higher. Meanwhile, the firing temperature is preferably 900° C. or lower, more preferably 850° C. or lower, and further preferably 800° C. or lower. This firing temperature is preferably higher from the viewpoint of sufficient oxidation and is preferably lower from the viewpoint of energy consumption. In the heat-resistant member according to the present invention, the protective layer may be produced by using a metal raw material having an average particle diameter of 1 µm or more and 40 µm or less. The average particle diameter of this raw material for the protective layer may be preferably 30 µm or less, more preferably 10 µm or less, and further preferably 5 µm or less. Meanwhile, this average particle diameter is more preferably 3 m or more. This average particle diameter of the raw material particles refers to a median diameter (D50) measured by using a laser diffraction/scattering particle size distribution analyzer, where the dispersion medium is water. Also, in the heat-resistant member according to the present invention, the protective layer may be produced by using a metal raw material exhibiting a volume change ratio Y/X, which is the ratio of a volume after oxidation Y to a volume before oxidation X, of 0.7 or more. In particular, the protective layer may be produced by using a metal raw material exhibiting a volume change ratio Y/X of preferably 1.3 or more, and further preferably 1.6 or more.

The protective layer according to the present invention may be produced by mixing a plurality of raw material powders having different particle sizes. Consequently, the bonding strength between the member to be protected and the protective layer can be further enhanced. For example, in the case where the member to be protected, on which the protective layer is formed, is porous ceramic, the protective layer may be produced by mixing a first raw material powder having an average particle diameter (µm) smaller than or equal to the average pore diameter A (µm) of the porous ceramic and a second raw material powder having an average particle diameter (µm) larger than the average pore diameter A. The average particle diameter (µm) of the first raw material powder is preferably, for example, a size one-half or less of the average pore diameter A (µm), and more preferably a size one-third or less thereof. Also, the average particle diameter (µm) of the second raw material powder is preferably, for example, a size two times or more of the average pore diameter A, and more preferably a size three times or more thereof. The first raw material powder is preferable for the purpose of entering pores of the porous ceramic and the second raw material powder is preferable for the purpose of enhancing the strength of the protective layer in itself. At this time, it is preferable that the amount of blend of the first raw material powder be larger than the amount of blend of the second raw material powder. For example, the amount of blend of the first raw material powder is preferably 20 percent by volume or more an a volume proportion basis, and more preferably 35 percent by volume or more. The protective layer may be produced by using only the first raw material powder having an average particle diameter smaller than or equal to the average pore diameter A of the porous ceramic.

The heat-resistant member according to the present invention is not specifically limited insofar as a structure in which the protective layer is disposed on the surface of the member to be protected is provided and can be used for, for example, honeycomb structures, thermoelements, ceramic heaters, and gas detection sensors of oxygen, NOx, and the like. As for a honeycomb structure, for example, the heat-resistant member is favorably used for a honeycomb structure which is heated by applying a voltage to a metal member.

Next, a method for manufacturing the heat-resistant member according to the present invention will be described. The method for manufacturing the heat-resistant member according to the present invention may include, for example, a base material producing step to produce the member to be protected and the protective layer forming step to form a raw material (metal raw material) for the protective layer on the surface of the member to be protected. The member to be protected may be prepared separately and the base material producing step may be omitted.

Base Material Producing Step

In this step, the member to be protected is produced. For example, in the case where the member to be protected is porous ceramic or dense ceramic, the member to be protected may be produced by mixing raw materials, performing molding by a predetermined molding method, and firing the resulting molded material. This porous ceramic may be formed containing at least one inorganic material selected from the group consisting of, for example, carbides, e.g., silicon carbide, titanium carbide, zirconium carbide, and boron carbide, nitrides, e.g., silicon nitride, aluminum nitride, titanium nitride, and zirconium nitride, oxynitrides, e.g., sialon, silicides, e.g., molybdenum silicide, and zirconium phosphate. Also, the porous ceramic may be formed containing at least one inorganic material selected from the group consisting of, for example, cordierite, mullite, zeolite, aluminum titanate, aluminum oxide, zirconium oxide, titanium oxide, silicon oxide, and magnesium oxide. In this step, for example, body and slurry may be prepared by mixing an inorganic material serving as aggregate, a pore-forming material, and a dispersion medium. At this time, preferably, the raw material blending is tailored in such a way that the porosity of the porous ceramic becomes within the range of, for example, 10 percent by volume or more and the average pore diameter becomes within the range of 1 µm or more and 300 µm or less. Also, in this step, the number to be protected may be produced by performing a treatment to impregnate pores of the porous ceramic with an impregnant.

In this impregnation treatment, for example, the impregnant base material may be formed on the porous ceramic and heating may be performed at a temperature at which the impregnant base material is melted. In the case where the porous ceramic is a Si-bonded SiC sintered material, the impregnant may be metal Si.

In this step, in the case where the amber to be protected is a metal member, the metal may be worked into a predetermined shape. The metal member is not specifically limited insofar as the member is made from a metal, e.g., a typical metal or a transition metal. For example, a metal having high electrical conductivity is preferable. As for the transition metals, metals and alloys of Fe, Co, Ni, Cu, and the like are preferable. Also, noble metals, e.g., Pt and Au, may be used in accordance with the use. This metal member may be worked into, for example, a tabular shape.

Protective Layer Forming Step

In this step, a treatment to form the protective layer on part of or all surfaces of the member to be protected is performed. Examples of raw materials used for the protective layer include metal powders. It is preferable that the metal powder is converted to oxide ceramic by oxidation. A powder of the porous ceramic does not exhibit sufficient bonding to the member to be protected even by a heat treatment and, therefore, is not suitable for a raw material of the protective layer. The metal powder may be, for example, a powder of the typical metal or be a powder of the transition metal, although the powder of the transition metal is preferable from the viewpoint of giving the electrical conductivity. For example, the metal powder having an average particle diameter within the range of 1 μm or more and 40 μm or less is used preferably. In this range, an appropriate bonding strength is obtained easily. This average particle diameter of the raw material for the protective layer is preferably 30 μm or less, more preferably 10 μm or less, and further preferably 5 μm or less. Meanwhile, this average particle diameter is more preferably 3 μm or more.

In this step, the raw material powder for the protective layer may be prepared by mixing a plurality of raw material powders having different particle sizes. Consequently, the bonding strength between the member to be protected and the protective layer can be further enhanced. For example, in the case where the member to be protected is porous ceramic, a first raw material powder having an average particle diameter (μm) smaller than or equal to the average pore diameter A (μm) of the porous ceramic and a second raw material powder having an average particle diameter (μm) larger than the average pore diameter A may be mixed. The average particle diameter (μm) of the first raw material powder is, for example, preferably a size one-half or less of the average pore diameter A (μm), and more preferably a size one-third or less. Also, the average particle diameter (μm) of the second raw material powder is, for example, preferably a size two times or more of the average pore diameter A, and more preferably a size three times or more. The first raw material powder is preferable for the purpose of entering pores of the porous ceramic and the second raw material powder is preferable for the purpose of enhancing the strength of the protective layer in itself. At this time, it is preferable that the amount of blend of the first raw material powder be larger than the amount of blend of the second raw material powder. For example, the amount of blend of the first raw material powder is preferably 20 percent by volume or more on a volume proportion basis, and more preferably 35 percent by volume or more. Only the first raw material powder having an average particle diameter smaller than or equal to the average pore diameter A of the porous ceramic may be employed as raw material powder for the protective layer.

In this step, it is preferable that besides a first component, which is a metal as a main component, a compound (second compound) containing a second component which is a metal element be added to the raw material powder for the protective layer. This second compound may be an electrically conductive aid. In the case where the second compound is added to the protective layer, for example, the main oxide of the oxide ceramic makes a solid solution with the second compound and, thereby, the electrical conductivity is further given, so that reduction in the electrical conductivity due to use by heating can be further suppressed favorably. Also, in the case where the second compound is added to the protective layer, favorably, the electric resistance of the protective layer can be further reduced and heat generation does not occur easily. This second compound is preferably, for example, a compound containing a metal element having a valence different from the valence of the main oxide, and may contain the same type of metal as the main oxide or a different type of metal. This second compound preferably contains at least one element of, for example, Li, Na, K, Ga, Si, Zr, Ti, Sn, Nb, Sb, and Ta. The second compound may be a carbonate or an oxide. The amount of addition of the second compound is preferably, for example, 0.2 percent by mole or more on an amount of moles of all elements in the protective layer basis, more preferably 0.5 percent by mole or more, and further preferably 1.0 percent by mole or more. Meanwhile, this content is preferably 50 percent by mole or less, more preferably 30 percent by mole or less, and further preferably 15 percent by mole or less. Specifically, in the case where the main oxide of the oxide ceramic is $Fe_2O_3$, examples of the second compounds include $Fe_3O_4$ and FeO, which are the same type of element, and $TiO_2$, $SnO_2$, $Nb_2O_5$, $SiO_2$, $ZrO_2$, and the like, which are different types of elements. Also, in the case where the main oxide is CuO and NiO, examples of the second compounds include $Li_2CO_3$, $Na_2CO_3$, and $K_2CO_3$.

In this step, the firing treatment can be performed in, for example, the air. The firing temperature is preferably 400° C. or higher and 900° C. or lower. In this temperature range, the metal raw material can be oxidized to oxide ceramic. This firing temperature is set within a preferable range in accordance with the material of the protective layer and is more preferably 500° C. or higher, and further preferably 600° C. or higher. Meanwhile, the firing temperature is more preferably 850° C. or lower, and further preferably 800° C. or lower. This firing temperature is preferably higher from the viewpoint of sufficient oxidation and is preferably lower from the viewpoint of energy consumption. As described above, the protective layer can be formed on the surface of the member to be protected in a simple atmosphere, that is, in the air, and at a lower temperature of 900° C. or lower. Also, in this step, the firing is performed in such a way that the porosity of the oxide ceramic becomes preferably 5 percent by volume or less, more preferably 4 percent by volume or less, and further preferably 3 percent by volume or less. The oxide ceramic is more preferably a dense body from the viewpoint of the strength. Also, in this step, the firing is preferably performed in such a way that the porosity of the oxide ceramic becomes 0.5 percent by volume or more, the firing is more preferably performed in such a way that 10 percent by volume or more is reached, and the firing is further preferably performed in such a way that 20 percent by volume or more is reached. It is more preferable that the oxide ceramic have pores from the viewpoint of stress relaxation.

According to the heat-resistant member and the method for manufacturing the same of the present embodiment described above, the heat-resistant member can be provided by a simpler method, wherein changes in characteristics are reduced more than ever before. The reason for this is estimated as described below. For example, the protective layer is metal oxide ceramic and, therefore, is stable under even a high temperature and an oxygen atmosphere. In addition, the raw material of the protective layer is specified to be a metal raw material relatively rich in the reactivity, so that the reaction with the member occurs easily to some extent, and the protective layer and the member can be banded in the state in which, for example, the component of the me ter is taken in and this component is diffused. Meanwhile, it is considered that firing is performed in the air, the metal is oxidized and is changed to become difficult-to-react and, thereby, the member component taken in is prevented from excessively diffusing into the protective layer. Therefore, changes in the characteristics, e.g., electrical conductivity and oxidation resistance, can be reduced more than ever before by a simple method in which the metal raw material is formed and firing is performed in the air. Also, as for the heat-resistant member according to the present embodiment, in formation of the protective layer, the protective layer can be formed in the air at a low temperature easily without the need for atmosphere control, e.g., a vacuum or inert gas atmosphere.

It is needless to say that the present invention is not limited to the above-described embodiments and can be executed in various forms within the technical scope of the present invention.

EXAMPLES

Examples of specific production of heat-resistant members will be described below with reference to Experimental Examples. Experimental Examples 1 to 7 correspond to the examples of the present invention and Experimental Examples 8 and 9 correspond to comparative examples.

Production of Heat-Resistant Member

An Fe—Cr based alloy (stainless steel SUS430) and a Ni based alloy (Inconel 600) serving as metal members were prepared as members to be protected. In addition, a Si-bonded SiC sintered material and a Si-impregnated SiC sintered material serving as ceramic members were prepared as members to be protected. The Si-bonded SiC sintered material was produced as described below. A SiC powder and a metal Si powder were mixed in such a way that the volume ratio became 38:22, and a molding raw material was produced by adding hydroxypropylmethyl cellulose serving as a binder, starch as a pore-forming material, and a water-absorbing resin and, in addition, adding water. The molding raw material was kneaded to form a body, and the resulting body was extruded with an extruder to obtain a molded material. The resulting molded material was dried in the air atmosphere at 120° C. and, thereafter, was degreased in the air atmosphere at 450° C. Subsequently, firing was performed in an Ar atmosphere at normal pressure and 1,450° C. for 2 hours. The resulting Si-bonded SiC sintered material had a porosity of 40 percent by volume. Also, the Si-impregnated SiC sintered material was obtained by impregnating the resulting Si-bonded SiC sintered material with metal Si. The impregnation treatment was performed as described below. Initially, metal Si pellets were placed on the Si-bonded SiC sintered material, a reduced pressure atmosphere at 1,500° C. was established, and the metal Si was impregnated into the porous material on the basis of capillarity. Subsequently, Ar was introduced until the atmospheric pressure was reached and cooling was performed to obtain the Si-impregnated SiC sintered material. This base material had a porosity of 0.1 percent by volume or less, where the measurement was performed on the basis of a mercury penetration method by using a mercury porosimeter.

A paste of the protective layer was produced by mixing a raw material powder (metal powder of Fe or Cu) for the protective layer, polyvinylbutyral resin (PVB) serving as a binder, and terpineol serving as a solvent. The resulting paste was applied to one surface of the member to be protected, drying was performed in the air at 80° C. for 4 hours and, thereafter, firing was performed in the air at 750° C. for within the range of 0.5 to 5 hours.

Experimental Examples 1 to 9

In Experimental Examples 1 and 2, the member which was the object of protection was specified to be an Fe—Cr based alloy, the metal raw material for the protective layer was specified to be an Fe powder, and the second compound (electrically conductive aid) was specified to be $TiO_2$ (1 percent by mole and 3 percent by role, respectively). The Fe powder having an average particle diameter of 3 μm was used. In Experimental Example 3, the member which was the object of protection was specified to be an Fe—Cr based alloy, the metal raw material for the protective layer was specified to be a Cu powder, and an addition material was specified to be $Li_2CO_3$ (1 percent by mole). The Cu powder having an average particle diameter of 5 μm was used. In Experimental Examples 4 and 5, the member which was the object of protection was specified to be a Ni based alloy, the metal raw material for the protective layer was specified to be an Fe powder, and the electrically conductive aid was specified to be $TiO_2$ (3 percent by mole and 4.7 percent by mole, respectively). In Experimental Examples 6 and 7, the member which was the object of protection was specified to be SiC, the metal raw material for the protective layer was specified to be an Fe powder, and the electrically conductive aid was specified to be $TiO_2$ (1 percent by mole and 5 percent by mole, respectively). In Experimental Examples 1 to 7, the firing time was specified to be 1 hour. In Experimental Examples 8 and 9, the members which were the objects of protection were specified to be an Fe—Cr based alloy and a Ni based alloy, respectively, and the protective layer was not formed.

Experimental Examples 10 to 14

In Experimental Examples 10 and 11, the member which was the object of protection was specified to be an Fe—Cr based alloy, the metal raw material for the protective layer was specified to be an Fe powder, and the second compound (electrically conductive aid) was not added. In Experimental Example 10, the firing time was specified to be 5 hour. In Experimental Example 11, the firing time was specified to be 0.5 hour. In Experimental Examples 12 and 13, the member which was the object of protection was specified to be a Si-impregnated SiC sintered material, the metal raw material for the protective layer was specified to be an Fe powder, and the second compound (electrically conductive aid) was specified to be $TiO_2$ (1 percent by mole). In Experimental Example 12, the firing time was specified to be 0.5 hour. In Experimental Example 13, the firing time was specified to be 5 hour. In Experimental Examples 10 to 13, the Fe powder having an average particle diameter of 3 in was used. In Experimental Example 14, the member which was the object of protection was specified to be an Fe—Cr based alloy, the metal raw material for the protective layer was specified to be an Fe powder, and the second compound (electrically conductive aid) was not added. The Fe powder having an average particle diameter of 53 μm was used. The member, the raw material for the protective layer, the firing atmosphere, and the firing temperature in each Experimental Example are collectively shown in Table 1.

Identification of Crystal Phase of Protective Layer

The constituent crystal phase of the oxide ceramic of the protective layer was identified by using the heat-resistant member produced as described above. A rotating anode XRD diffractometer (RINT produced by Rigaku Corporation) was used for the measurement, and the X-ray diffraction pattern of the material was obtained. The conditions of the X-ray diffraction measurement were specified to be CuKα-ray source, 50 kV, 300 mA, and 2θ=20° to 60°. The resulting X-ray diffraction data were analyzed by using "X-ray data analysis software JADE 7" produced by MDI.

TABLE 1

| | | Raw Material for Protective Layer | | | |
|---|---|---|---|---|---|
| | Member to be Protected | Kind of Raw Material | Particle Diameter of Metal Raw Material μm | Ti Amount /mol % | Firing Atmosphere | Firing Temperature ° C. |
| Experimental Example 1 | Fe—Cr based alloy | Fe, $TiO_2$ | 3 | 1.0 | Air | 750 |
| Experimental Example 2 | Fe—Cr based alloy | Fe, $TiO_2$ | 3 | 3.0 | | |
| Experimental Example 3 | Fe—Cr based alloy | Cu, $Li_2CO_3$ | 5 | Li Amount 1.0 | | |
| Experimental Example 4 | Ni based alloy | Fe, $TiO_2$ | 3 | 3.0 | | |
| Experimental Example 5 | Ni based alloy | Fe, $TiO_2$ | 3 | 4.7 | | |
| Experimental Example 6 | Si-bonded SiC | Fe, $TiO_2$ | 3 | 1.0 | | |
| Experimental Example 7 | Si-bonded SiC | Fe, $TiO_2$ | 3 | 5.0 | | |
| Experimental Example 8 | Fe—Cr based alloy | | | None | | |
| Experimental Example 9 | Ni based alloy | | | | | |
| Experimental Example 10 | Fe—Cr based alloy | Fe | 3 | 0 | Air | 750 |
| Experimental Example 11 | Fe—Cr based alloy | Fe | 3 | 0 | | |
| Experimental Example 12 | Si-impregnated SiC | Fe, $TiO_2$ | 3 | 1 | | |
| Experimental Example 13 | Si-impregnated SiC | Fe, $TiO_2$ | 3 | 1 | | |
| Experimental Example 14 | Fe—Cr based alloy | Fe | 53 | 0 | | |

Thermal Analysis of Metal Raw Material for Protective Layer

Figure 5:
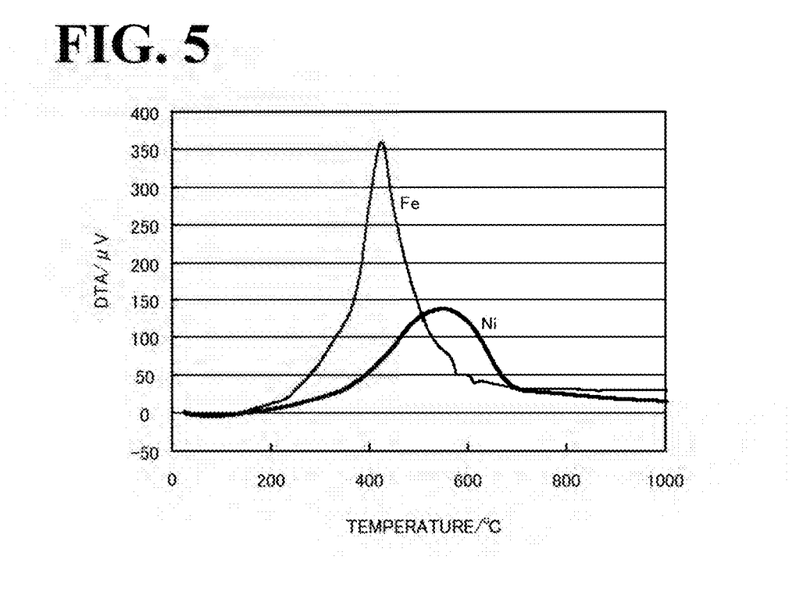
FIG. 5 shows measurement results based on the thermal analysis of the metal raw material of the protective layer.

Thermal analysis of the Fe powder among the metal raw materials for the protective layer of the heat-resistant member was performed. In addition, thermal analysis of the Ni powder which can be utilized as the protective layer was also performed. The measurement was performed by using 80 mg of sample with a TG-DTA analyzer (Thermo Plus EVO produced by Rigaku Corporation) at room temperature to 1,000° C. FIG. 5 shows measurement results based on the thermal analysis of the metal raw material of the protective layer. Heat generation of Fe started from 200° C. and an exothermic peak appeared at 420° C. Heat generation of Ni started from 200° C. and an exothermic peak appeared at 550° C. It was found that, favorably, these metals were converted to oxides easily by being heated at 400° C. or higher. Also, it was estimated that heat based on heat generation was given and, thereby, the firing treatment was able to be performed with higher amount of heat as compared with the amount of heat corresponding to the firing temperature.

Constituent Component Analysis of Protective Layer and Member

The heat-resistant member produced as described above was embedded into a resin, and a cross-section suitable for observation of the member and the protective layer (oxide ceramic) at the same time was polished to an extent of a mirror-smooth state. The resulting polished surface was observed with an electron microscope (SEM; XL30 produced by Philips) at the magnification of 1,500 times and a microstructure photograph was taken. At the time of this SEM observation, for example, solid solution components in the protective layer were analyzed with SEM-EDK.

Porosity of Protective Layer

Figure 6:
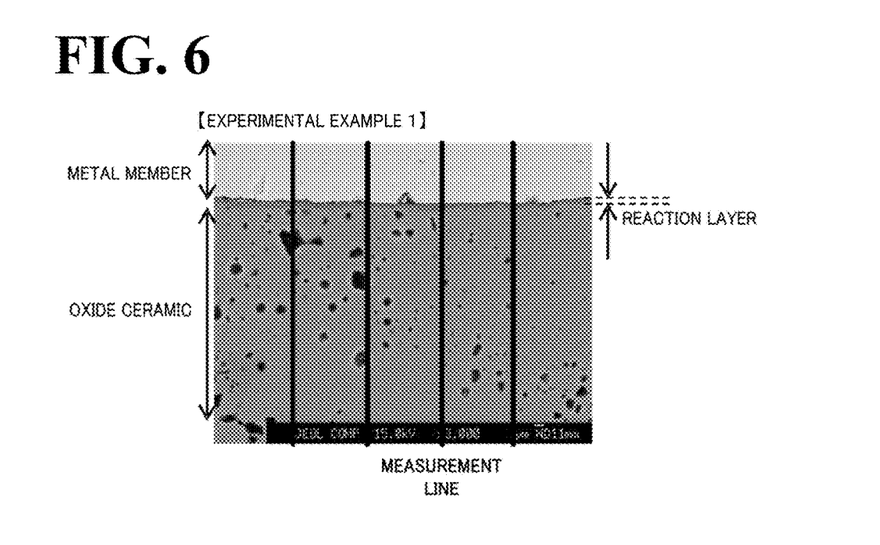
FIG. 6 shows a SEM photograph of the cross-section of the metal member and the protective layer in Experimental Example 1.

The porosity of the protective layer was measured by subjecting the image of the microstructure photograph taken as described above to image analysis. FIG. 6 shows a SEM photograph of the cross-section of the metal member and the protective layer in Experimental Example 1. Image-Pro 0.5J was used as the image analysis software. A region having an area of $0.5 \times 10^{-6}$ m$^2$ of the protective layer was selected from the microstructure photograph arbitrarily, and binarization was performed to distinguish the images of pores and oxide ceramic. The oxide ceramic and pores thereof were sepa rated on the basis of the resulting image and the porosity of the protective layer was determined by calculating the area ratio thereof. This area ratio of the cross-section was assumed to substantially correspond to the volume ratio and, therefore, was specified to be the porosity (percent by volume).

Thickness of Reaction Layer at Interface

The heat-resistant member formed as described above was used and the bonding interface was examined. The thickness of the reaction layer generated at the interface between the member and the protective layer was measured by using an image on the basis of the observation with an electron microscope (SEM). Specifically, an observation sample was prepared by polishing the heat-resistant member embedded in a resin to an extent of a mirror-smooth state with a diamond slurry. The polished surface of the cross-section was observed with SEM-EDX at the magnification of 3,000 times. Subsequently, as explained in FIG. 4, perpendicular lines (measurement lines) which divided the interface of this image into five equal parts and which were normal to the interface were drawn, and the length between the point of intersection of the lower limit of the reaction layer generated at this interface and the measurement line and the point of intersection of the upper limit and the measurement line was measured. Then, an average of the five places was specified to be the thickness of the reaction layer. In the case where contrast due to a composition difference was not observed at the interface even when observation was performed with SEM at the magnification of 3,000 times, it was determined that a reaction layer was "none".

Electric Resistivity

Figure 7:
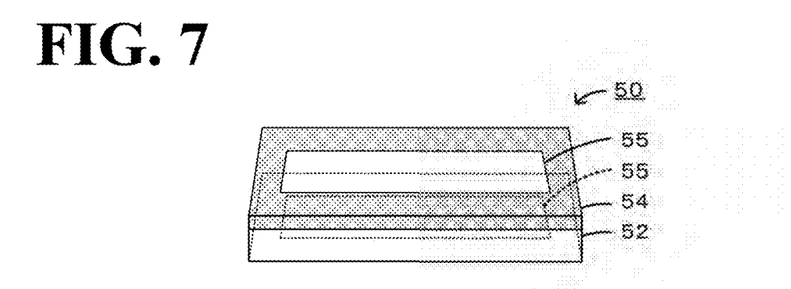
FIG. 7 is an explanatory diagram showing a heat-resistant member 50 used in measurement of the electric resistivity.

The electric resistivity of the heat-resistant member was measured by using a heat-resistant member 50 shown in FIG. 7. As shown in FIG. 7, a measurement sample was prepared by baking Ag paste of 15 mm×15 mm serving as electrodes 55 on the heat-resistant member 50 including a rectangular parallelepiped member 52 of 20 nm×20 mm and a rectangular parallelepiped protective layer 54. A source meter (Model 2450 produced by Keithley Instruments, Inc.) was connected to the electrodes of the heat-resistant member 50, and the electric resistivity of the heat-resistant member was measured by a direct current two-terminal method.

Heat Resistance Test

A heat resistance test of the heat-resistant member was performed. The heat-resistant member produced as described above was used and was held in the air at 800° C. for 24 hours. The heat-resistant member after this heat treatment was subjected to the appearance evaluation, the thickness measurement of the reaction layer, and the oxidation resistance evaluation. The oxidation resistance was evaluated an the basis of a change in electric resistance between before and after the heat treatment. As for the oxidation resistance evaluation, the case where there was no change in electric resistance was specified to be A, the case where the electric resistance value was less than $10^6$ Ωcm was specified to be B, and the case where the electric resistance value was $10^6$ Ωcm or more was specified to be C.

Results and Consideration

The measurement results of Experimental Examples 1 to 14 are collectively shown in Table 2. In Table 2, the member to be protected, the material of the protective layer, the electric resistances, appearances, and reaction layer thicknesses before and after the heat resistance test, and the oxidation resistance evaluations are collectively shown. As shown in Table 2, in Experimental Examples 1 to 7, the crystal phases of the protective layers were oxides. Also, the porosities of the protective layers were 1.8 to 4.0 percent by volume. In Experimental Examples 1 to 7, the reaction layer was disposed between the member to be protected and the protective layer and the thickness thereof was 1 µm or less. It is considered that the interface between the oxide ceramic serving as the protective layer and the member to be protected is bonded by diffusion of part of the components constituting the member into the oxide ceramic. For example, as a result of element analysis of the interface, it was found that at the interface between the Fe—Cr based alloy (SUS430) and the $Fe_2O_3$ based oxide ceramic, Cr and trace component Mn in SUS diffused to the oxide ceramic layer. Also, it was found that at the interface between the Si-bonded SiC sintered material and the $Fe_2O_3$ based oxide ceramic, the Si component diffused to the oxide ceramic layer. It was considered that in the heat-resistant member according to the present embodiment, a metal more active than the oxide was used as the raw material for the protective layer, the reaction with the member occurred easily, and the components of the member were taken in easily. In addition, it was considered that the firing was performed in the air, the metal was thereby oxidized in association with an increase in temperature and became difficult-to-react, and the member component taken in was prevented from excessively diffusing into the protective layer. Also, it was found that the protective layer was transition metal oxide ceramic and, therefore, had favorable electrical conductivity.

Also, in Experimental Examples 1 to 7, the bonding state and the electric resistance hardly changed after the heat resistance test and there was a tendency of the heat resistance evaluation to become high. The reason for this was considered to be that the protective layer was the oxide ceramic and, thereby, further diffusion of the component contributing to the bonding was suppressed. Also, in Experimental Examples 1 to 7, the electrically conductive aid ($TiO_2$, $O_5$, $LiCO_3$) was contained in the protective layer, and evaluations of the electric resistance and the heat resistance were very good, as shown in Table 2. In particular, it was found that there was a tendency of the electric resistance value to be reduced in association with an increase in the amount of addition of the electrically conductive aid and, therefore, more preferably, the electrically conductive aid was contained in the oxide ceramic. Also, it was found that the resistance of the protective layer was able to be further reduced by adding these electrically conductive aids. Consequently, it was found that, for example, in the case where the heat-resistant member was used as a conduction member, favorably, heat generation did not occur easily. Also, it was found that in the case where the electrically conductive aid was added, reduction in the electrical conductivity due to use by heating was able to be further suppressed because it is considered that, for example, the oxide ceramic makes a solid solution with elements of the electrically conductive aids and, thereby, the electrical conductivity is further given. For example, it is considered that in the case where the main oxide of the oxide ceramic is the Fe oxide, the electrical conductivity is provided by different phases, e.g., $Fe_3O_4$, or oxygen defects introduced into $Fe_2O_3$. However, it is considered that in the case where the heat-resistant member is used by heating, those different phases and oxygen defects are reduced and, thereby, the electrical conductivity is reduced. On the other hand, it is considered that in the case where the electrically conductive aid containing different types of elements is included, the different types of elements contained in the main oxide as a solid solution contribute to the electrical conductivity, and the evaluation of the heat resistance was estimated to be improved. As shown in Experimental Examples 10 and 11, it was found that even in the case where the electrically conductive aid was not added, good bondability and oxidation resistance were obtained. On the other hand, in Experimental Example 14 in which the porosity of the protective layer was 45 percent by volume, it was found that degradation in characteristics after the heat resistance test was considerable and the heat resistance was insufficient. Consequently, it was found that a relatively dense protective layer having a porosity of 5 percent by volume or less was favorable.

As described above, it was found that as for the heat-resistant member provided with the metal oxide ceramic protective layer on the surface, changes in characteristics were reduced more than ever before by the simpler method. In particular, the present examples had remarkable advantage that in formation of the protective layer, the protective layer was able to be formed in the air at a low temperature easily without the need for atmosphere control, e.g., a vacuum or inert gas atmosphere.

TABLE 2-1

| Member to be Protected | Material of Protective Layer | | | | Porosity of Protective Layer vol % |
|---|---|---|---|---|---|
| | Crystal Phase | Constituent Component | | | |
| Experimental Example 1 | Fe—Cr based alloy | $Fe_3O_4$, $Fe_2O_3$ | Fe | Ti | O | 2.5 |
| Experimental Example 2 | Fe—Cr based alloy | $Fe_2O_3$ | Fe | Ti | O | 2.0 |
| Experimental Example 3 | Fe—Cr based alloy | CuO, $Cu_2O$ | Cu | Li | O | 1.8 |
| Experimental Example 4 | Ni based alloy | $Fe_3O_4$, $Fe_2O_3$ | Fe | Ti | O | 2.2 |
| Experimental Example 5 | Ni based alloy | $Fe_2O_3$ | Fe | Ti | O | 2.4 |
| Experimental Example 6 | Si-bonded SiC | $Fe_3O_4$, $Fe_2O_3$ | Fe | Ti | O | 3.5 |
| Experimental Example 7 | Si-bonded SiC | $Fe_2O_3$ | Fe | Ti | O | 4.0 |
| Experimental Example 8 | Fe—Cr based alloy | | | | None | |
| Experimental Example 9 | Ni based alloy | | | | | |
| Experimental Example 10 | Fe—Cr based alloy | $Fe_2O_3$ | Fe | | O | 2.3 |
| Experimental Example 11 | Fe—Cr based alloy | $Fe_3O_4$, $Fe_2O_3$ | Fe | | O | 2.5 |
| Experimental Example 12 | Si-impregnated SiC | $Fe_3O_4$, $Fe_2O_3$ | Fe | Ti | O | 1.8 |
| Experimental Example 13 | Si-impregnated SiC | $Fe_2O_3$ | Fe | Ti | O | 3.2 |
| Experimental Example 14 | Fe—Cr based alloy | $Fe_3O_4$, $Fe_2O_3$ | Fe | | O | 45 |

TABLE 2-2

| | Properties Before Heat Resistance Test | | | Properties After Heat Resistance Test | | | | |
|---|---|---|---|---|---|---|---|---|
| | Electric Resistance $\Omega \cdot cm$ | Appearance (Presence of Crack and Peel-off) | Reaction Layer Thickness $\mu m$ | Electric Resistance $\Omega \cdot cm$ | Appearance (Presence of Crack, Peel-off, and Change of Color) | Reaction Layer Thickness $\mu m$ | Oxidation Resistance | Other Remarks |
| Experimental Example 1 | 2.0 | None | 0.48 | $4.6 \times 10^4$ | None | 0.56 | B | One surface coating |
| Experimental Example 2 | 1.4 | None | 0.18 | 1.4 | None | 0.20 | A | |
| Experimental Example 3 | 1.8 | None | 0.20 | 1.8 | None | 0.18 | A | |
| Experimental Example 4 | 2.0 | None | 0.30 | $3.8 \times 10^2$ | None | 0.31 | B | |
| Experimental Example 5 | 1.8 | None | 0.22 | 1.8 | None | 0.20 | A | |
| Experimental Example 6 | 57.0 | None | None | $2.4 \times 10^4$ | None | 0.50 | A | |
| Experimental Example 7 | 48.0 | None | None | 52.0 | None | 0.72 | A | |
| Experimental Example 8 | $10^{-6}$ or less | None | None | More than $10^6$ | Change of Color | None | C | |
| Experimental Example 9 | $10^{-8}$ or less | None | None | More than $10^8$ | Change of Color | None | C | |
| Experimental Example 10 | $6.5 \times 10^6$ | None | 0.39 | $8.0 \times 10^8$ | None | 0.42 | B | |
| Experimental Example 11 | 2.5 | None | 0.39 | $1.2 \times 10^4$ | None | 0.42 | B | |
| Experimental Example 12 | 2.1 | None | 0.58 | $3.5 \times 10^4$ | None | 0.6 | B | |
| Experimental Example 13 | 1.8 | None | 0.70 | 2.1 | None | 0.85 | A | |
| Experimental Example 14 | 9.1 | None | Unobservable | More than $10^8$ | None | Unobservable | C | |

The present application claims priority from Japanese Patent Application No. 2014-055878 filed on Mar. 19, 2014, the entire contents of which are incorporated herein by reference.

What is claimed is:

1. A heat-resistant member comprising:
   a member to be protected; and
   a metal oxide ceramic protective layer which is disposed on part of or all surfaces of the member and which has a porosity of 0 percent by volume or more and 5 percent by volume or less,
   wherein the protective layer contains a first component as a main component made from an oxide of at least one selected from the group consisting of Fe, Cu and Ni, and a second component that contains at least one element selected from the group consisting of Li, Na, K, Ga, Si, Zr, Ti, Sn, Nb, Sb and Ta, and
   wherein the heat-resistant member has an electric resistivity of 0.1 $\Omega$cm or more and 100 $\Omega$cm or less.

2. The heat-resistant member according to claim 1, wherein a reaction layer deriving from at least one of the member and the protective layer is disposed between the member and the protective layer.

3. The heat-resistant member according to claim 2, wherein the reaction layer has a thickness of 3.0 µm or less.

4. The heat-resistant member according to claim 1, wherein the member is a metal having electrical conductivity.

5. The heat-resistant member according to claim 1, wherein the member is non-oxide ceramic.

6. The heat-resistant member according to claim 1, wherein the member is a metal having electrical conductivity and the protective layer is made from an electrically conductive oxide.

7. The heat-resistant member according to claim 1, wherein the member is non-oxide ceramic and the protective layer is made from an electrically conductive oxide.

8. A method for manufacturing a heat-resistant member, comprising the step of forming a protective layer by firing a member provided with a metal raw material in the air in a temperature range lower than the melting point of an oxide of the metal raw material to form a metal oxide ceramic protective layer having a porosity of 0 percent by volume or more and 5 percent by volume or less on part of or all surfaces of the member,
   wherein the protective layer contains a first component as a main component made from an oxide of at least one selected from the group consisting of Fe, Cu and Ni, and a second component that contains at least one element selected from the group consisting of Li, Na, K, Ga, Si, Zr, Ti, Sn, Nb, Sb and Ta, and
   wherein the heat-resistant member has an electric resistivity of 0.1 $\Omega$cm or more and 100 $\Omega$cm or less.

9. The method for manufacturing a heat-resistant member according to claim 8, wherein in the forming of a protective layer, the member is fired within the range of 400° C. or higher and 900° C. or lower.

10. The method for manufacturing a heat-resistant member according to claim 8, wherein in the forming of a protective layer, a reaction layer deriving from at least one of the member and the protective layer is formed between the member and the protective layer.

11. The method for manufacturing a heat-resistant member according to claim 10, wherein in the forming of a protective layer, the reaction layer having a thickness of 3.0 µm or less is formed.

12. The method for manufacturing a heat-resistant member according to claim 8,
   wherein the member is a metal having electrical conductivity or non-oxide ceramic, and
   the protective layer is made from an electrically conductive oxide.

13. The heat-resistant member according to claim 1, wherein the protective layer has a porosity of at least 0.5 percent by volume.

* * * * *